No. 848,305. PATENTED MAR. 26, 1907.
G. E. HOLMES & A. G. & J. M. BOSTROM.
SOFA BED.
APPLICATION FILED APR. 25, 1906.
4 SHEETS—SHEET 1.
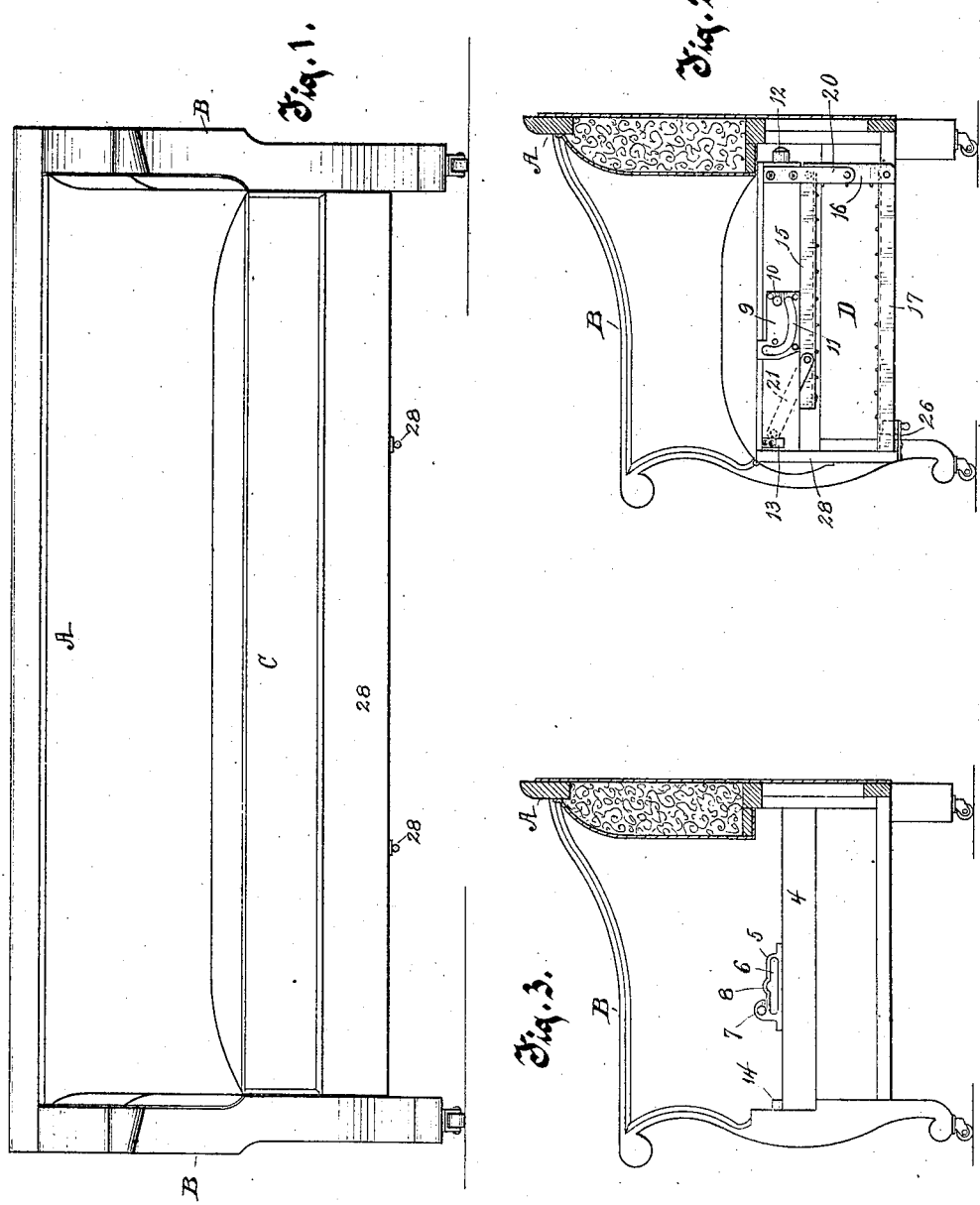

No. 848,305. PATENTED MAR. 26, 1907.
G. E. HOLMES & A. G. & J. M. BOSTROM.
SOFA BED.
APPLICATION FILED APR. 25, 1906.
4 SHEETS—SHEET 2.
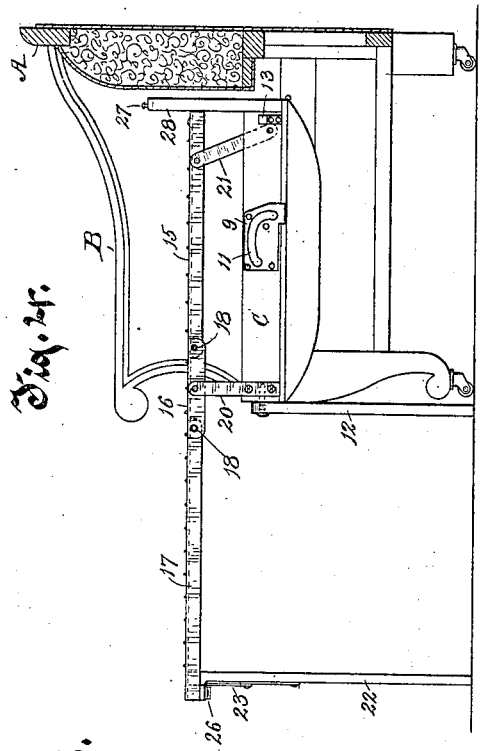
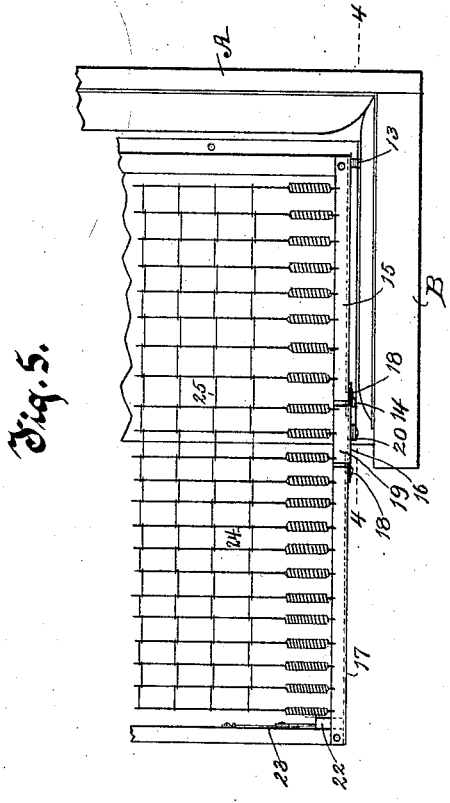
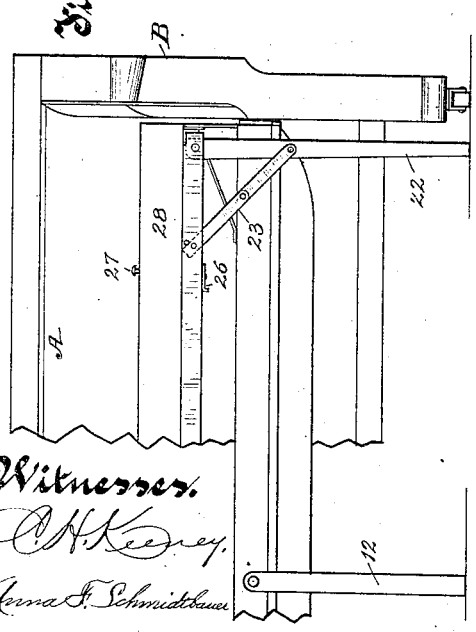
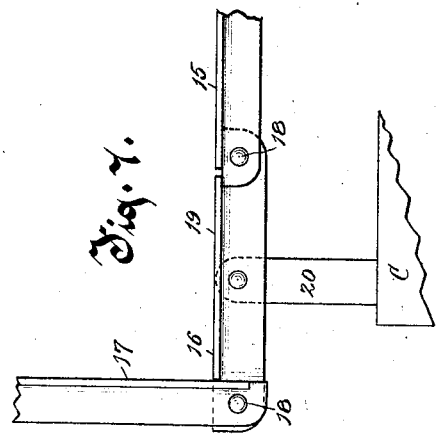
Witnesses.
Inventors.
Gustav E. Holmes
Axel G. Bostrom
John M. Bostrom
By Benedict, Morsell & Caldwell
Attorneys.

No. 848,305. PATENTED MAR. 26, 1907.
G. E. HOLMES & A. G. & J. M. BOSTROM.
SOFA BED.
APPLICATION FILED APR. 25, 1906.
4 SHEETS—SHEET 3.
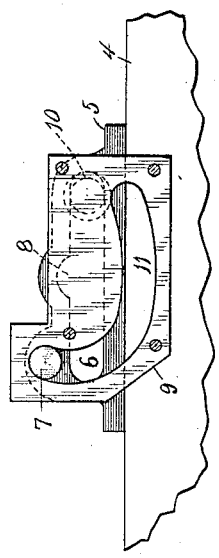
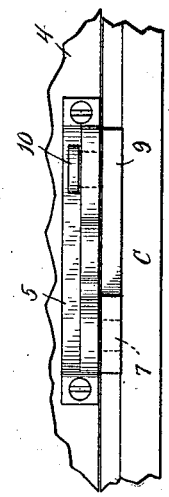
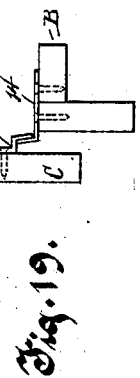
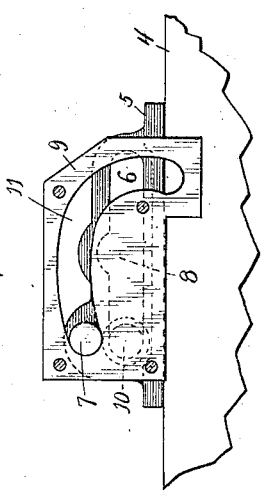
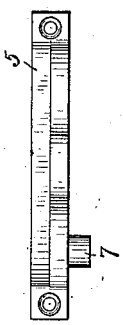
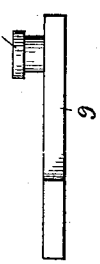
Witnesses.
Inventors.

No. 848,305. PATENTED MAR. 26, 1907.
G. E. HOLMES & A. G. & J. M. BOSTROM.
SOFA BED.
APPLICATION FILED APR. 25, 1906.
4 SHEETS—SHEET 4.
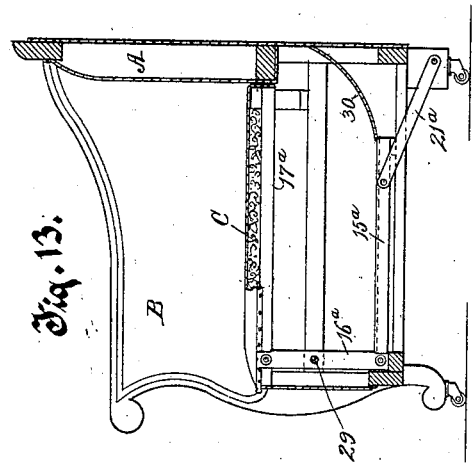
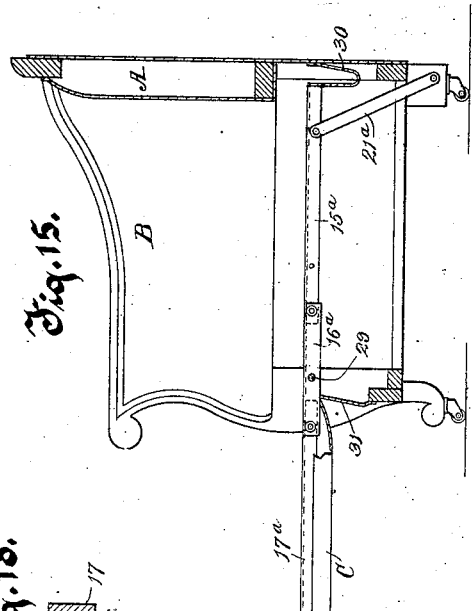
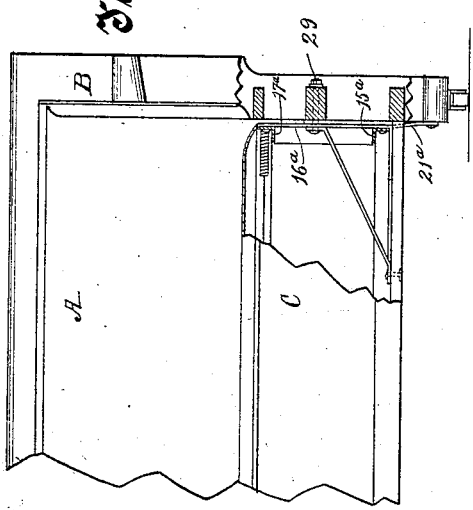
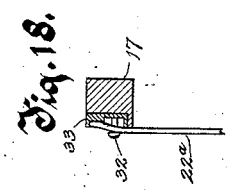
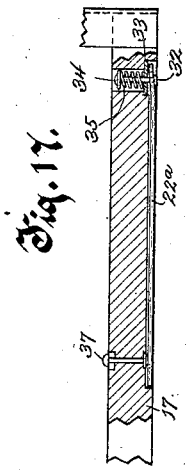
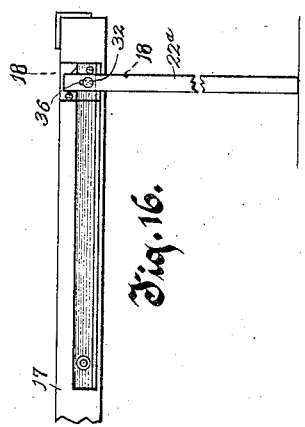
Witnesses.
Inventors.
Gustav E. Holmes
Axel G. Bostrom
John M. Bostrom
By Benedict, Morsell & Caldwell.
Attorneys.

UNITED STATES PATENT OFFICE.

GUSTAV E. HOLMES, AXEL G. BOSTROM, AND JOHN M. BOSTROM, OF MILWAUKEE, WISCONSIN.

SOFA-BED.

No. 848,305.   Specification of Letters Patent.   Patented March 26, 1907.

Application filed April 25, 1906. Serial No. 313,543.

*To all whom it may concern:*

Be it known that we, GUSTAV E. HOLMES, AXEL G. BOSTROM, and JOHN M. BOSTROM, residing in Milwaukee, county of Milwaukee, and State of Wisconsin, have invented new and useful Improvements in Sofa-Beds, of which the following is a description, reference being had to the accompanying drawings, which are a part of this specification.

This invention relates to improvements in an article of household furniture commonly known as a "sofa-bed," which principally is in the form of a sofa, so as ordinarily to be used in that form, but which may be readily converted into a bed.

The invention is directed chiefly to the novel structure of the auxiliary bed-bottom and to the means related thereto whereby it is snugly packed away in the sofa when not in use and can be easily and quickly converted into a usable bed-bottom, including the means for properly supporting and securing the bed-bottom in position.

The invention consists of the parts and their combinations, as herein described and claimed, or the equivalents thereof.

In the drawings, Figure 1 is a front elevation of the improved sofa-bed in its condition as a sofa. Fig. 2 is a transverse section of the sofa just inside of one arm or end of the sofa, showing the end of the sofa-seat and the thereunder folded and supported bed-bottom. Fig. 3 is a transverse section of the sofa, showing the inner surface and construction of the arm or end of the sofa. Fig. 4 is a transverse section on line 4 4 of Fig. 5, showing the bed-bottom unfolded or extended for a bed. Fig. 5 is a plan of a fragment of the frame and of the bed-bottom extended for a bed. Fig. 6 is a front elevation of a fragment of the improved sofa-bed in condition for use as a bed. Fig. 7 is a detail of the end rail of the bed-bottom and a means of support. Fig. 8 shows a detail of the device for supporting the sofa-seat in a manner permitting its being turned upside down when the article is to be used for a bed. Fig. 9 is a plan of the device shown in Fig. 8. Fig. 10 represents the device of Fig. 8 in the overturned position of the seat. Figs. 11 and 12 are plan views of the separated parts of the device of Fig. 8. Fig. 13 is a transverse section of the sofa-bed, showing the ends of the sofa-seat and bed-bottom in modified form. Fig. 14 is a front elevation of a fragment of the modified structure of Fig. 13, parts being in section to exhibit interior construction. Fig. 15 is a transverse section of the modified form of Fig. 13 with the bottom extended as a bed. Fig. 16 is a detail of the structure of a leg and its attachment to the bed-bottom. Fig. 17 is a fragment of the frame of the bed-bottom, partly in section, showing the manner of the attachment of the leg thereto. Fig. 18 is a transverse section on line 18 18 of Fig. 16, and Fig. 19 is a detail of a locking device.

In the drawings there is shown a sofa frame or body consisting of a back A and the arms or ends of the sofa B B. These parts are of any suitable size and form to make up a sofa frame or body like or similar to those in common use, the arms or ends being rigid to the back, making a strong and durable frame or body of the sofa-bed.

The sofa-seat C is also of a form in common use and consists of a rectangular frame having thereon an upholstered or other cover forming the seat proper of the part. This rectangular or box-like seat in this sofa-bed is mounted on the frame pivotally, so that it is adapted to be turned over upside down, the pivotal support of the seat being at its respective ends and medially of its width.

Mounted on and secured to sills 4 in the arms or ends of the sofa-frame there are supporting-blocks 5, one at each end of the sofa-frame, each of which blocks is provided with a horizontally-disposed elongated slot 6 and with a stud-pin 7, projecting laterally inwardly from one side of the block at a little distance from and advisably above the front end of the slot 6. The slot 6 is enlarged medially at 8 to provide a sufficient aperture for the insertion and removal of a pin with a head thereon to and from the slot, which head is too large to escape from the slot otherwise than through such enlarged aperture.

On the ends of the seat-frame there is a hinge-plate 9, secured to the seat-frame opposite and complementary to the supporting-blocks 5. This hinge-plate is provided with a headed pivot-pin 10, which pin is adapted to enter and fit movably in the slot 6 in the block 5. Also the hinge-plate 9 is provided with a curved slot 11, eccentric to the pin 10, which slot is adapted to receive movably therein the stud-pin 7 of the block 5, whereby the hinge-plate 9 when with the seat it is swung about the pivot-pin 10 is caused to move laterally on the block, and at the same time the pivot-pin 10 slides in and longitudinally of the slot 6 in the block 5. By means of the pivot-pins 10 on the ends of the seat C, slidable in the slots 6 in the blocks 5, and the stud-pins 7 on the blocks 5, riding in the eccentric slots 11, the sofa-seat may be turned upside down, and when so turned the seat will be shifted toward the front of the sofa-body to the extent of the length of the slots 6 in the supporting-blocks 5. The result of this shifting movement of the sofa-seat may be seen by comparing the position of the sofa-seat in Fig. 2, in which the rear edge of the seat is under a ledge or bottom edge of the back of the body, with the position of the sofa-seat as shown in Fig. 4, where the sofa-seat is shown as reversed upside down and the sofa-seat shifted forwardly away from beneath the ledge or bottom of the back of the body of the sofa.

The sofa-seat C is advisably provided with legs 12, pivoted to that edge of the frame of the sofa-seat which is at the rear when the sofa-seat is in the position shown in Figs. 1 and 2. These legs are so pivoted to the frame of the seat that when the seat is overturned to the position shown in Fig. 4 the legs are adapted to be swung down and their free ends to rest as feet on the floor, whereby when the seat is in this position the then front edge of the seat is supported by the legs directly on the floor. These legs are folded up behind the frame when it is to be turned back to the form of a sofa-seat, as shown in Figs. 1 and 2. Also the seat-frame is provided with locking devices, one on each end, Fig. 19, each consisting, preferably, of a catch 13, secured to the end of the frame and projecting slightly divergingly outwardly downwardly therefrom and adapted to engage a complementary catch 14, fastened on the sill or arm of the frame or body of the sofa, the catch 14 being inclined to engage wedgingly the diverging portion of the catch 13, whereby the two catch members 13 and 14 interlock wedgingly and securely when the seat is employed as a sofa in the manner shown in Figs. 1 and 2.

In connection with the sofa-seat C there is a bed-bottom, composed in a general way of side and end rails and a spring-wire mattress, which bed-bottom is in three sections or members—an inner section 15, an intermediate or medial section 16, and an outer section 17. The transverse end rails of these inner and outer sections are hinged to the end rails of the medial section in the manner shown best in Figs. 2, 4, and 7, the rails being of angle-bar and the vertical flanges of the rails of the sections 15 and 17 being made to overlap the vertical flange of the rails of the sections 16 and being hinged thereto by pivot-pins 18. The horizontal flanges of these thus-hinged rails are cut away near the ends of the rails to permit of the overlapping and fitting close together of the flat sides of the vertical flanges at and adjacent to the pivot, and the vertical flanges of the rails of sections 15, 17, and 19 severally project rearwardly underneath and fit upwardly against the horizontal flange of the rails of the thereto-hinged section when the sections are unfolded and extended in the same horizontal plane in the manner shown in Fig. 4. This construction strengthens the structure and assists in preventing the sections 15 and 17 from tilting downwardly out of the plane of the section 16 when the bed-bottom is extended. The section 16 is pivoted at each end on legs 20, secured rigidly to the frame of the seat C in such manner that the section 16 can be swung to the horizontal position with reference to the legs 20 when in an upright position, as shown in Fig. 4, or can be swung to a vertical position in the manner shown in Fig. 2 when the bed-bottom is folded up with reference to the sofa-seat C. Also folding legs 21, one at each end of the bed, are pivoted at one end to the end rails of the section 15 and to the ends of the frame of the sofa-seat C at their other ends, whereby the bed-bottom is braced and held in position with reference to the sofa-seat at the inner end of the bed-bottom when extended in the manner shown in Fig. 4 and is drawn up to and held against the under side of the sofa-seat frame when the bed-bottom is folded up in the manner shown in Fig. 2. The outer section 17 of the bed-bottom is also provided with supporting-legs 22, which are pivoted to the outer side rail of the section 17 on its inner surface, so as to be adapted to fold up behind the rail of the section.

A double-section folding brace 23 is pivoted at one end to each leg 22 and at its other end to the outer side rail of the bed-section, whereby the leg is secured in upright position when the bed is unfolded in the manner shown in Figs. 4 and 6, but permitting the leg to be folded up behind the rail when the bed is to be folded up in the manner shown in Fig. 2.

The bed-bottom may be provided with a flexible wire mattress of any character adapted to serve as a mattress and at the same time to permit of the folding up of the sections; but preferably a mattress is provided which consists of a series of parallel longitudinal wires 24, stretched from end rail to end rail of the sofa-sections, with transverse connecting-wires 25, the connecting-wires being bent around the longitudinal wires, whereby they are held thereto and at the same time have such movement as permits of the folding up and unfolding of the sections of the bed-bottom. When the bed-bottom is folded up in the manner shown in Fig. 2, the buttons 26, pivoted and swiveling on the edge of the outer rail of the outer bed-section 17, extend in one direction across the infolded legs 22 and in the other direction extend to and receive the headed pins 27 in recesses therein, whereby the buttons 26 serve as latches, securing the section 17 in place detachably with reference to the sofa-seat by their engagement with the pins 27, which are fixed in the lower edge of the apron 28 of the sofa-seat, as well as incidentally holding the folded legs 22 in place.

It will be observed that when the structure is folded up and in the condition for use as a sofa, as shown in Figs. 1 and 2, that the inner section 15 of the bed-bottom is held close to and practically against the under side of the frame of the sofa-seat and that the outer section 17 of the bed-bottom is located at a distance below the section 15, thus providing a space or receptacle D between these sections, which is utilized for holding bedclothes. The bed is made up on the bottom and is folded up in this space at the time of folding up the bed-bottom and before the sofa-seat, with the bed-bottom thereon and the bed therein, are turned over from the position of the seat as shown in Fig. 4 to the position shown in Fig. 2. Of course by the reverse operation the bed is opened out for use on the extended bed-bottom.

It will be understood that because of the construction of the bed-bottom, consisting of the leaf-like sections 15 and 17, hinged to the intermediate sections 16, which is pivoted medially on standards, and because of the arrangement of the folding legs 21 the two leaf-like sections 15 and 17 of the bed-bottom are held apart when the bed-bottom is folded up, thus forming the receptacle for the bed. It will also be noted that in unfolding the bed-bottom the swinging of the sections 17 and 15 into horizontal positions as illustrated in Figs. 7 and 4 the section 15 will be elevated from its position as shown in Fig. 2 by reason of the interlocking end of the rails of the sections at the locality of their hinges, as shown in Fig. 7 in connection with the elevating effect of the folding legs 21, caused by their being swung upwardly and rearwardly by the unfolding of the sections to the position shown in Fig. 4.

In Figs. 13, 14, and 15 the bed-bottom structure is shown in a changed or modified form. In this form of structure the bed-bottom section 17$^a$ is formed on and is rigid to the under surface of or is really the frame of the sofa-seat C, and this bed-bottom section 17$^a$, with the sofa-seat rigid thereto, is pivoted at its front edge to the intermediate bed-bottom section 16$^a$, which intermediate section is pivoted medially to the frame or body of the sofa, conveniently by means of pivot-pins 29, and the section 15$^a$ of the bed-bottom is pivoted to the other extremities of the rails of the intermediate section 16$^a$, and the other edge of the section 15$^a$ is supported by folding legs 21$^a$, pivoted to it and at their other extremities pivoted to the body or frame of the sofa, conveniently to the rear legs thereof, as shown in Figs. 13 and 15. A flexible apron 30, that may be of coarse cloth, is attached at one edge to the inner edge of section 15$^a$ and at the other edge to the rear wall of the back A of the sofa, forming a flexible closure across the space between the section of the bed-bottom and the wall of the back of the sofa. A similar flexible apron 31 is attached along its upper edge to the front edge of the frame of the sofa-seat and along its lower edge to a cross bar or member of the body or frame of the sofa between the front legs thereof.

In Figs. 16, 17, and 18 there is a leg 22$^a$, having a modified means of attachment to the edge of the section 17, which in many cases is preferable to the means shown in Figs. 4 and 6. A pin 32, having a head on its outer end, is inserted loosely through the leg and extends movably through a plate 33, secured rigidly in a socket therefor in the side rail of section 17, the pin passing into a chamber therefor in the side rail and being provided with an enlarged head or nut 34, between which head and the plate 33 there is a spring 35, coiled about the pin, which spring is adapted to expand and draw the leg 22$^a$ to the plate 33 and into a socket therefor. In the plate 33 there is a recess extending upwardly from the pin 32 of such size and form as just to receive the upper end of the leg 22$^a$, so that when the end of the leg is in this socket and is held yieldingly thereto by the spring 35 the leg cannot swing around to improperly let down the edge of the bed-section. Also the leg 22$^a$ is provided with a longitudinal slot 36, extending from the pivot-aperture, whereby when the leg is to be folded up alongside of the rail of the section 17 the leg can be drawn down endwise away from the socket in the plate 33, in which the upper end of the leg is received, thereby permitting the leg to be swung around horizontally parallel with the rail of the bed-section, and there is a recess in the edge of the rail of the bed-section, in which the leg 22$^a$ is received, so that when folded up and drawn into this recess its outer surface will be flush with the surface of the rail. A loose pin 37 is provided, which passes through the rail and is adapted to be pushed against the free end of the leg to push it out of the recess when the leg is to be unfolded to be swung into the position shown in Fig. 16.

What we claim as our invention is—

1. A sofa-bed, comprising a body including a rigid back and arms, a seat pivoted at its ends and reversible rotatably on the body, and a bed-bottom in three longitudinal sections hinged to each other, the medial section being pivoted in unvarying pivotal relation to and supported medially on the sofa-seat.

2. In a sofa-bed, a pivoted and overturning seat, and a bed-bottom in three sections hinged to each other adapted to be folded to form a clothes-receptacle under the seat and to be unfolded to form an expanded bed-bottom in a plane above the seat.

3. In a sofa-bed, a pivoted and revolubly-overturning seat, a bed-bottom in three longitudinal sections, the two marginal sections being wider than the medial section and being hinged at the side edges thereof to the respective edges of the medial section, means for supporting the distant edges of the two marginal sections, and means for supporting the medial section at its ends medially pivotally and in unvarying relation pivotally to said supporting means.

4. In a sofa-bed, a pivoted and revolubly-overturning seat, a bed-bottom in three longitudinal sections, the two marginal sections being comparatively wide and the medial section being comparatively narrow, means supporting the medial section pivotally whereby it can be swung to horizontal position and in the same plane with the marginal sections and also can be swung to vertical position and the two marginal sections to opposite and parallel positions at a distance apart substantially equal to the width of the medial section.

5. In a sofa-bed, a rigid body-frame, a sofa-seat pivoted at its ends and revolubly reversible on the frame, a bed-bottom in three longitudinal sections hinged together, means to which the medial bed-section is medially pivoted and thereby supported tiltingly, and means supporting in connection with the medial bed-section the distant portion of one marginal bed-section movably and shiftably in a plane constantly parallel to the plane of the sofa-seat.

6. In a sofa-bed, a rigid body-frame, a sofa-seat pivoted at its ends overturningly on the frame, a bed-bottom in three longitudinal sections, the two wider marginal sections hinged respectively to the medial narrower section, legs fixed on the sofa-seat to which the medial section is medially pivoted, and folding legs hinged to one outer bed-section and to the seat adapted with the medial section to support that section shiftably in a plane constantly parallel with the sofa-seat.

7. In a sofa-bed, a rigid body-frame, a sofa-seat pivoted at its ends overturningly on the frame, a bed-bottom in three longitudinal sections the two wider marginal sections hinged respectively to the medial narrower section, legs fixed on the sofa-seat to which the medial section is pivoted medially, folding legs hinged to one outer bed-section and to the seat adapted with the medial section to support that section shiftably in a plane constantly parallel with the sofa-seat, and folding legs on the free edge of the outer bed-section adapted to support the section in the plane of the two other bed-sections that are mounted and supported directly and entirely on the sofa-seat.

8. In a sofa-bed, a reversible seat, bed-sections hinged to the sofa-seat and adapted to be unfolded into an expanded bed-bottom, legs hinged to the extended section adapted to unfold and rest on the floor, and means for locking the legs in unfolded position comprising a plate with each leg, to which the leg is pivoted and having a socket into which the end of the leg is received, and a spring adapted to hold the leg releasably in the socket.

9. In a sofa-bed, a sofa-seat having a depending front apron, a headed pin in the apron, a sectional folding bed-bottom mounted on the seat, a folding leg on a section, and a latch pivoted on the rail of the section adapted to swing over the folded leg and also onto the edge of the said apron and engage the pin therein locking the parts in relative position.

10. In a sofa-bed, a means for pivoting the sofa-seat revolubly and shiftingly on the sofa-frame, comprising a supporting-block having an elongated horizontal slot with a medial enlargement laterally of the slot-aperture and a stud-pin projecting from its side above one end of the slot, and a seat-hinge plate having a headed pivot-pin adapted to enter and travel in the slot in said block and provided with a curved slot eccentric to the headed pin adapted to receive therein the stud-pin on the block.

In testimony whereof we affix our signatures in presence of two witnesses.

GUSTAV E. HOLMES.
AXEL G. BOSTROM.
JOHN M. BOSTROM.

Witnesses:
C. T. BENEDICT,
ALMA A. KLUG.